US010116544B2

(12) United States Patent
Bonica et al.

(10) Patent No.: US 10,116,544 B2
(45) Date of Patent: Oct. 30, 2018

(54) EXTENDED PING PROTOCOL FOR DETERMINING STATUS FOR REMOTE INTERFACES WITHOUT REQUIRING NETWORK REACHABILITY

(71) Applicant: Juniper Networks, Inc., Sunnyvale, CA (US)

(72) Inventors: Ronald P. Bonica, Sterling, VA (US); Reji Thomas, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 177 days.

(21) Appl. No.: 15/188,934

(22) Filed: Jun. 21, 2016

(65) Prior Publication Data

US 2017/0366437 A1    Dec. 21, 2017

(51) Int. Cl.
*H04L 12/26* (2006.01)

(52) U.S. Cl.
CPC ......... *H04L 43/103* (2013.01); *H04L 43/065* (2013.01); *H04L 43/0811* (2013.01); *H04L 43/0817* (2013.01); *H04L 43/10* (2013.01); *H04L 43/12* (2013.01); *H04L 43/50* (2013.01)

(58) Field of Classification Search
CPC ..... H04L 43/103; H04L 43/50; H04L 43/065; H04L 43/0811; H04L 43/12; H04L 43/0817; H04L 43/10
See application file for complete search history.

(56) References Cited

U.S. PATENT DOCUMENTS

| | | | |
|---|---|---|---|
| 6,173,411 B1 | 1/2001 | Hirst et al. | |
| 6,507,869 B1 * | 1/2003 | Franke | H04L 29/12018 709/220 |
| 6,560,648 B1 * | 5/2003 | Dunn | H04L 41/12 709/223 |
| 6,618,360 B1 | 9/2003 | Scoville et al. | |
| 6,850,253 B1 | 2/2005 | Bazerman et al. | |
| 6,982,953 B1 | 1/2006 | Swales | |
| 7,120,693 B2 | 10/2006 | Chang et al. | |
| 7,219,030 B2 | 5/2007 | Ohtani | |
| 7,391,719 B2 | 6/2008 | Ellis et al. | |
| 7,471,638 B2 | 12/2008 | Torrey et al. | |
| 7,523,185 B1 | 4/2009 | Ng et al. | |
| 7,639,624 B2 | 12/2009 | McGee et al. | |

(Continued)

FOREIGN PATENT DOCUMENTS

| | | |
|---|---|---|
| EP | 1367750 A1 | 3/2003 |
| EP | 1814258 A2 | 8/2007 |

OTHER PUBLICATIONS

McCloghrie, "The Interfaces Group MIB," Request for Comments 2863, Network Working Group, Jun. 2000, 50 pgs.

(Continued)

*Primary Examiner* — Alina A Boutah
(74) *Attorney, Agent, or Firm* — Shumaker & Sieffert, P.A.

(57) ABSTRACT

An extend ping protocol is described that allow connectivity tests to be performed for individual network interfaces of a target device without requiring network reachability between the testing device and the remote interface whose status is being queried. Moreover, the extend ping protocol supports a plurality of different probe types that allow an administrator to control how identification information within an extended ping echo request is resolved to the unreachable interfaces.

20 Claims, 5 Drawing Sheets

(56) References Cited

U.S. PATENT DOCUMENTS

| | | | |
|---|---|---|---|
| 7,724,677 | B2 | 5/2010 | Iwami |
| 8,117,301 | B2 | 2/2012 | Kompella |
| 8,797,886 | B1* | 8/2014 | Kompella ............ H04L 43/0811 370/242 |
| 9,614,906 | B1* | 4/2017 | Hegde ................... H04L 67/104 |
| 9,787,559 | B1* | 10/2017 | Schroeder ............. H04L 43/067 |
| 2005/0030947 | A1* | 2/2005 | Alfano ..................... H04L 47/10 370/389 |
| 2005/0259634 | A1 | 11/2005 | Ross |
| 2006/0095538 | A1 | 5/2006 | Rehman et al. |
| 2006/0106919 | A1* | 5/2006 | Watkinson ............... H04L 41/00 709/220 |
| 2006/0112176 | A1* | 5/2006 | Liu ................... H04L 29/12066 709/245 |
| 2007/0041554 | A1 | 2/2007 | Newman et al. |
| 2007/0061103 | A1 | 3/2007 | Patzschke et al. |
| 2007/0160050 | A1* | 7/2007 | Wang ................. H04L 12/2697 370/392 |
| 2007/0192501 | A1* | 8/2007 | Kompella ............ H04L 12/2697 709/230 |
| 2007/0220252 | A1 | 9/2007 | Sinko |
| 2009/0019141 | A1 | 1/2009 | Bush et al. |
| 2011/0055381 | A1* | 3/2011 | Narasimhan .......... H04L 41/046 709/224 |
| 2012/0016933 | A1* | 1/2012 | Day ...................... H04L 63/102 709/203 |
| 2014/0304399 | A1* | 10/2014 | Chaudhary ......... H04L 41/5009 709/224 |
| 2015/0350054 | A1* | 12/2015 | Stokking ............. H04L 43/0888 370/253 |
| 2016/0174148 | A1* | 6/2016 | Seed .................. H04W 52/0216 370/311 |
| 2016/0337314 | A1* | 11/2016 | Yu .......................... H04L 63/083 |
| 2017/0034506 | A1* | 2/2017 | Dailey ................. H04N 17/004 |
| 2017/0085456 | A1* | 3/2017 | Whitner ................ H04L 43/103 |
| 2018/0046811 | A1* | 2/2018 | Andriani ............... G06F 21/577 |

OTHER PUBLICATIONS

R. Bonica et al., "Generic Tunnel Tracing Protocol (GTTP) Specification," IETF Standard-Working-Draft, Internet Engineering Task Force, Jul. 2001, XP015011025, 20pgs.

H. Berkowitz, "Router Renumbering Guide," IETF Standard, Internet Engineering Task Force, Jan. 1997, RFC 2072, XP015007856, 41, pgs.

E. Mannie—Editor, "Generalized Multi-Protocol Label Switching Architecture," IETF Standard-Working-Draft, Internet Engineering Task Force, May 2003, XP015001499, 56 pgs.

K. Kompella, "Signalling Unnumbered Links in Resource ReSerVation Protocol—Traffic Engineering (RSVP-TE)," IETF Standard-Working-Draft, Internet Engineering Task Force, Jan. 2003 RFC 3477, XP015009260, 8pgs.

Sun Hai-feng, "Advanced TCP Port Scan and Its Response," O.I. Automation 2005, vol. 24, No. 4, Apr. 24, 2005, China Academic Electronic Publishing House, http://www.cnki.net, 2pgs., Abstract Only.

A. Atlas, "ICMP Extensions for Unnumbered Interfaces," draft-atlas-icmp-unnumbered-00.txt, Dec. 9, 2005, 8 pgs.

A. Atlas, "ICMP Extensions for Unnumbered Interfaces," draft-atlas-icmp-unnumbered-01.txt, Feb. 2006, 8 pgs.

Prosecution History from U.S. Appl. No. 11/445,508, dated Jun. 1, 2006 through Jul. 25, 2011, 180 pp.

Zvon—RFC 2072 [Router Renumbering Guide]—Router Identifiers, chapter 83 Unnumbered Interfaces, www.zvon.org/tmRFC/RFC2072/Output/chapter8.html, last printed Nov. 7, 2005, 2 pgs.

"ICMP (Internet Control Message Protocol)," Data Network Resourse, www.rhyshaden.com/icmp.html, last printed Nov. 10, 2005, 4 pgs.

"Using the IP unnumbered configuration FAQ," APNIC, www.apnic.net/info/faq/ip_unnumb.html, Jul. 1, 2005, 2pgs.

"Traceroute," Webopedia, www.webopedia.com/TERM/t/traceroute.html, Aug. 26, 2004, 1 pg.

"RFC 2151—(rfc2151)—A Primer on Internet and TCP/IP Tools and Utilities," www.rfcsearch.org/rfcview/RFC/2151.html, last printed Nov. 9, 2005, 3 pgs.

Gorry Fairhurst, "Internet Control Message Protocol;" Internet Control Message Protocol (ICMP), www.erg.abdn.ac.uk/users/gorry/course/inet-pages/icmp.html, last printed Sep. 6, 2006, 3 pgs.

"ActiveXperts PING backgrounds (PING is part of the ActiveSocket Toolkit);" ActiveSocket Network Communication Toolkit 2.4, Activexperts, www.activexperts.com/activesocket/toolkits/ping.html, last printed Nov. 10, 2005, 3 pgs.

Vijay Mukhi et al., "Internet Control Message Protocol ICMP," www.vijaymukhi.com/vmis/icmp, last printed Sep. 6, 2006, 5 pgs.

"Configure the Loopback Interface," www.juniper.net/techpubs/software/junos/junos56/index.html, last printed Nov. 7, 2005, 2 pgs.

"Configure an Unnumbered Interface," www.juniper.net/techpubs/software/junos/junos56/index.html, last printed Nov. 7, 2005, 1 pg.

Atlas et al., "ICMP Extensions for Unnumbered Interfaces, draft-atlast-icmp-unnumbered-02," Internet-Draft, Internet Engineering Task Force, IETF, Mar. 4, 2007, 13 pp.

Bonica et al., "Extended Ping (eping), draft-bonica-intarea-eping-00," Internet-Draft, Internet Engineering Task Force, IETF, Jun. 23, 2016, 12 pp.

Extended Search Report from counterpart European Application No. 17177254.4, dated Oct. 20, 2017, 11 pp.

Response to European Search Report dated Oct. 20, 2017, from counterpart European Application No. 17177254.4, filed Jun. 26, 2018, 25 pp.

* cited by examiner

EXTENDED PING PROTOCOL FOR DETERMINING STATUS FOR REMOTE INTERFACES WITHOUT REQUIRING NETWORK REACHABILITY

TECHNICAL FIELD

This disclosure relates to computer networks and, more particularly, to utilities for determining the status of network interfaces.

BACKGROUND

Conventional software utilities, such as the commonly used ping utility, are useful tools for determining whether a remote interface is active. These tools typically require a user to enter a unique identifier, such as a particular internet protocol (IP) address, of a remote host in order to test the status of a corresponding network interface. For example, the ping protocol tests status of a remote interface by sending an Internet Control Message Protocol (ICMP) echo request packet to a specific IP address assigned to that interface. If an echo reply packet is not received within a defined time period, connectivity to that interface is assumed to be down.

In general, utilizing conventional ping to test the status of a particular network interface of a remote network device requires network reachability between the testing device and the remote network interface. For example, by specifying a global, publicly-reachable IP address of a particular interface of a remote device, an administrator may direct ping to that interface of the target device. When a private IP addresses is assigned to a network interface, such an interface can generally only be tested from a network device having network reachability to the private IP address, i.e., a network device within the same private network. Network interfaces having link-local IP addresses can generally only be tested using an interface connected to the same network link, i.e., from directly connected devices.

In this sense, global IP addresses may be preferable in terms of testability via software utilities such as conventional ping. However, assignment of global IP addresses to each individual network interface may be undesirable for many reasons. For example, assigning known IP addresses to each individual interface exposes the device to interface-specific network attacks, such as packet-flooding of a particular interface. Furthermore, assigning and managing individual IP addresses for each interface of each network device within a network may increase operational expenses.

For these reasons, network administrators may elect to forego assignment of an individual publicly known identifier, such as an IP address, to each network interface. Although this approach avoids the security risks and operational expenses associated with assignment of IP address to each interface, the network administrators are unable to use conventional testing utilities, such as ping, to test the status of particular network interfaces.

SUMMARY

In general, principles of the invention relate to techniques and protocols for extending network connectivity software utilities, such as ping, to support testing the status of unreachable interfaces. More specifically, in accordance with the principles described herein, the software utilities allow connectivity tests to be performed for individual network interfaces of a target device without requiring network reachability between the testing device and the remote interface whose status is being queried. Moreover, the extend ping protocol supports a plurality of different probe types that allow an administrator to control how identification information within an extended ping echo request is resolved to the unreachable interfaces, such as by interface address, interface name, interface description or interface index. In this way, even when interfaces of a remote target device have not been assigned a known unique identifier, such as a dedicated, publicly-known internet protocol (IP) address, an administrator may still use the software utilities to test the interfaces for connectivity.

In one example, a source network device comprises a hardware-based programmable processor; and an extended ping software utility executing on the processor of source network device that presents a user interface to receive input from a user. The input identifies a network address of a reachable network interface of a target device, identification information for an unreachable network interface, and a probe type that specifies one of a plurality of probe types by which the identification information identifies the unreachable interface. The software utility outputs a ping echo request packet to test the status of the unreachable interface of the target device, wherein the ping echo request packet includes a header having a destination address of the network address of the reachable network interface of the target device, an identification information object specifying the identification information, and a probe type field specifying the probe type by which the identification information identifies the unreachable interface of the target device.

In another example, a method comprises executing an extended ping software utility on a source network device and presenting, with the extended ping software utility, a user interface to receive input from a user. The input identifies a network address of a reachable network interface of a target device, identification information for an unreachable network interface of the target device, and a probe type that specifies one of a plurality of probe types by which the identification information identifies the unreachable interface. The method further includes outputting, from the source device with the software utility, a ping echo request packet to test the status of the unreachable interface of the target device. The ping echo request packet includes a header having a destination address of the network address of the reachable network interface of the target device. The ping echo request packet includes an identification information object specifying the identification information and a probe type field specifying the probe type by which the identification information identifies the unreachable interface of the target device.

In another embodiment, a method receiving, from a source device and via a reachable interface on a target device, an echo request packet to test the status of an unreachable interface on the target device. The ping echo request packet includes a header having a destination address of the reachable network interface of the target device. The ping echo request packet further includes an identification information object specifying identification information for the unreachable network interface of the target device and a probe type field specifying a probe type by which the identification information identifies the unreachable interface of the target device. The method further includes processing the probe type specified within the probe type field to select a mode for comparing the identification information to configuration data of the target device and, based on the selected mode, comparing the identification information to parameters within the configuration data of the target device to resolve the identification information to the unreachable network interface of target device. The method includes outputting, to the source device and via the reachable interface, a reply packet indicating a status of the unreachable interface.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
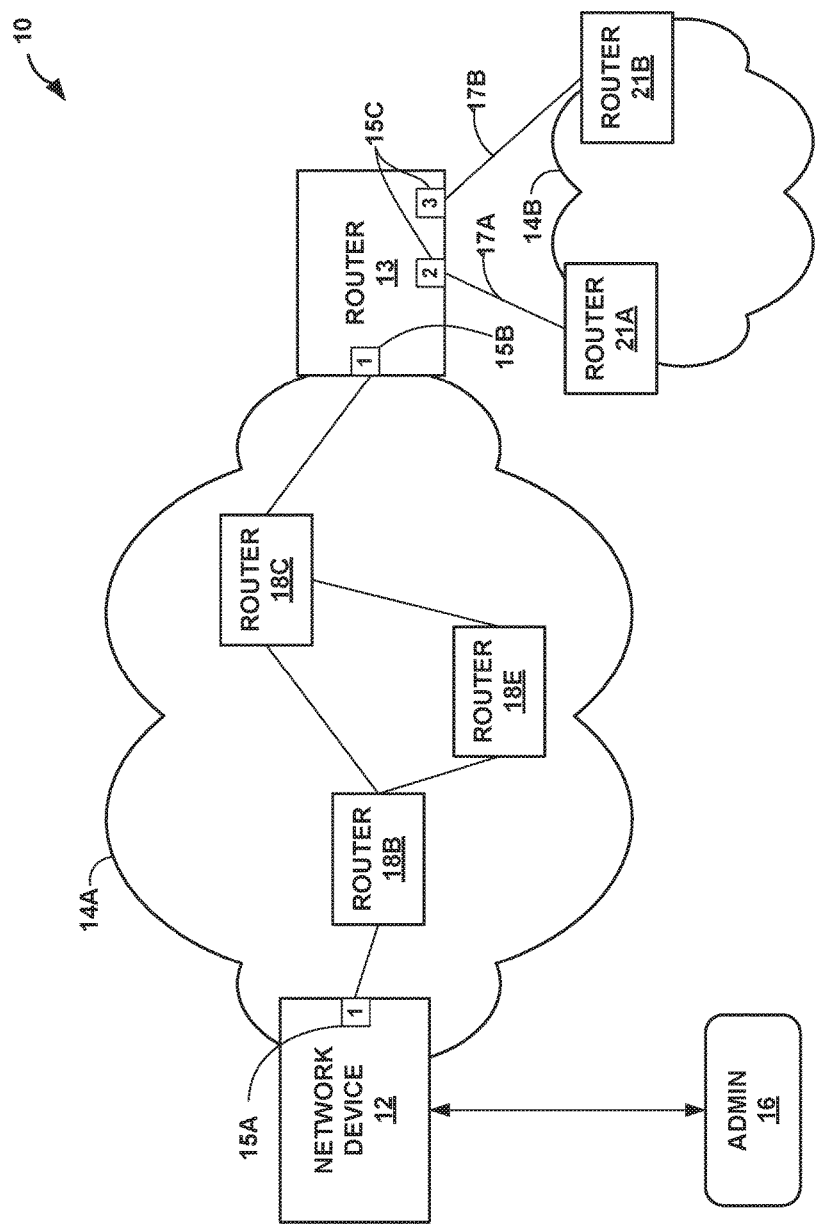
FIG. 1 is a block diagram illustrating an exemplary computer network in which an administrator utilizes a software utility to test the status of unreachable network interfaces of a target device.

FIG. 1 is a block diagram illustrating an exemplary network environment 10 in which an administrator 16 (ADMIN) uses a software utility executing on network device 12 to test the status of unreachable network interfaces 15B of remote router 13. In the example of FIG. 1, network device 12 and router 13 support use of a diagnostic software utility, such as a ping protocol, that has been extended to test the status of network interfaces for which there is no direct network reachability from the testing device.

In this example, network environment 10 includes network device 12 and router 13 connected across a first network 14A via intermediate routers, switches and other devices, shown for purposes of example as routers 18A-18C (collectively, routers 18). As shown, network device 12 and router 13 includes network interfaces 15A, 15B, respectively, connected to network 14A. Network 14A may comprise any public or private network or the Internet. For example, network 14A may be a public network such that network interfaces 15A and 15B may be assigned globally routable, public IP address. Alternatively, network 14A may be a private network such that each of network interfaces 15A, 15B are assigned private IP addresses from an address space utilized with network 14A. In any event, network 14A provides network reachability between interface 15A of network device 12 and interface 15B of router 13. Network device 12 and router 13 are described for purposes of example and may be desktops, laptops, servers, routers, gateways or other devices suitable for implementing the techniques described herein.

In this example, router 13 further includes network interfaces 15C that couple router 13 to routers 21A, 21B of a second network 14B via links 17A, 17B, respectively. As one example, network 14B may be a private network having an address space different from network 14A such that, in general, network reachability does not exist between network device 12 and network devices located within network 14B. As such, network device 12 does not have network reachability to network interfaces 15C of router 13 since, in this example, network interfaces 15C have IP addresses of scope that is not reachable from network device 12. Although network interfaces 15A and 15C are shown for purposes of example as being positioned on separate networks 14A, 14B, the techniques described herein may be applied to test the status of remote network interfaces that are unreachable from the testing network device for a variety of reasons, such as simply being unassigned a specific IP address.

As described herein, administrator 16 accesses network device 12 and invokes a diagnostic software utility that has been extended in such a manner so as to allow the administrator to initiate a status test with respect to unreachable network interfaces 15C of router 13. That is, this document describes a new diagnostic tool called Extended Ping (eping). Network operators use eping to determine whether a remote interface is active. In this respect, eping is similar to ping. Eping differs from ping in that it does not require reachability between the probing node and the probed interface. Or, said another way, eping does not require network reachability between the node upon which it executes and the interface whose status is being queried.

During the testing process, administrator may specify a specific reachable network interface of router 13, e.g., network interface 15B, and further specify at least one unreachable interface, such as any of interfaces 15C, to be probed. In this example, the Internet Control Message Protocol (ICMP) has been extended to support testing the status of unreachable interfaces 15, and ICMP packets between network device 12 and 12B include additional fields so as to allow router 13 to disambiguate the request to a particular unreachable network interfaces.

For example, in general, Eping utilizes two new ICMP messages, called Extended Echo and Extended Echo Reply, described herein. The Extended Echo message makes a semantic distinction between the destination interface (e.g., network interface 15B of router 13) and the probed interface (e.g., either of network interfaces 15C). The destination interface is the interface to which the Extended Echo message is delivered and reachable from the probing node (network device 12). The probed interface (e.g., either network interface 15C) is the interface whose status is being queried and does not need to be reachable from the probing node. However, the destination and probed interfaces are local to one another (i.e., the same node supports both interfaces), e.g., network interfaces 15B, 15C on router 13). Because the Extended Echo message makes a distinction between the destination interface 15B and probed interfaces 15C, eping executing on network device 12 can probe every interface 15C on router 13 as long the utility can reach at least one network interface on the probed node (router 13). In many cases, this allows network operators to decrease their dependence on widely-scoped interface addressing.

In some embodiments, the software utility is extended in a manner in which the additional fields are opaque to the intermediate routing devices as well as the target device being tested. In these embodiments, when a target device does not support the extension, the target device replies in a conventional fashion. Moreover, although described by way of example to ping, the techniques may be applied to extend other network software utilities for diagnosing network conditions with respect to unreachable interfaces. Moreover, the techniques need not necessarily be applied to extend an existing, conventional protocol. Rather, the techniques may be incorporated in a new diagnostic utility.

Figure 2:
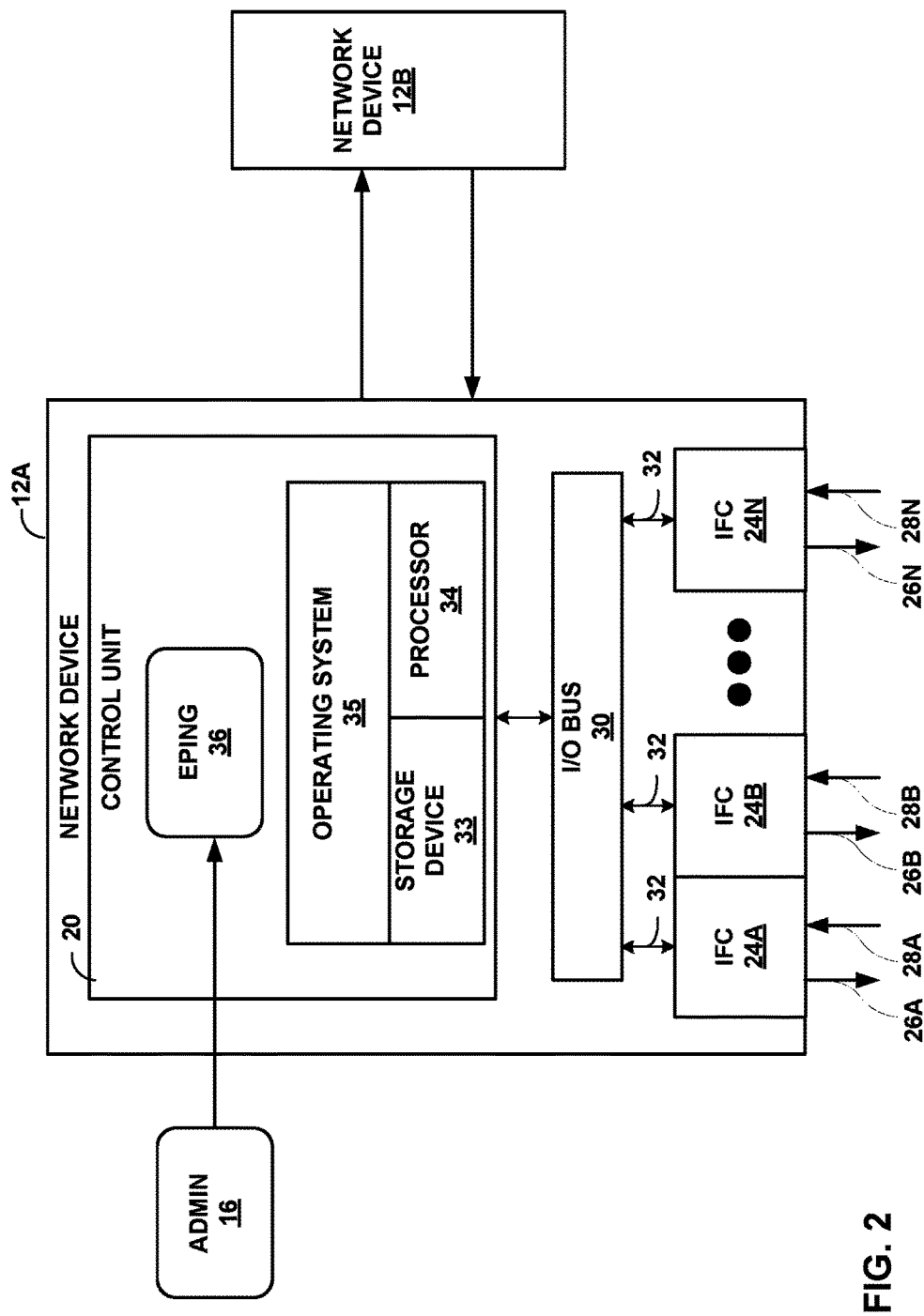
FIG. 2 is a block diagram illustrating an example embodiment of a network device that allows an administrator to test the status of unreachable interfaces.

FIG. 2 is a block diagram illustrating an example embodiment of a network device, such as network device 12, that allows administrator 16 to perform status testing of unreachable interfaces as described herein.

In the example embodiment, network device 12 includes interface cards 24A-24N (collectively, "IFCs 24") that send and receive packet flows via inbound network links 26A-26N (collectively, "inbound network links 26") and outbound network links 28A-28N (collectively, "outbound network links 28"), respectively. IFCs 24 coupled to control unit 20 by an input/output bus 30. In general, control unit 20 provides an operating environment of executing software instructions stored within storage device 33. For example, control unit 20 may include one or more programmable processors 34 capable of executing software instructions. Operating system 35, when executed by processor 34, provides an execution environment for software components, including diagnostic protocols such as eping 36. Diagnostic protocols 36 allow network device 12 to output enhanced request packets, and receive enhanced reply packets, as described herein. Although described for exemplary purposes with respect to a computer, the source device or the target device may be any form of network device, and either or both of the devices may have one or more unnumbered interfaces. Examples of other devices include servers, laptops, desktops, mobile devices, intrusion detection devices, virtual private network (VPN) appliances, routers, hubs, switches, gateways, firewalls, security devices and other network devices and appliances.

Figure 3:
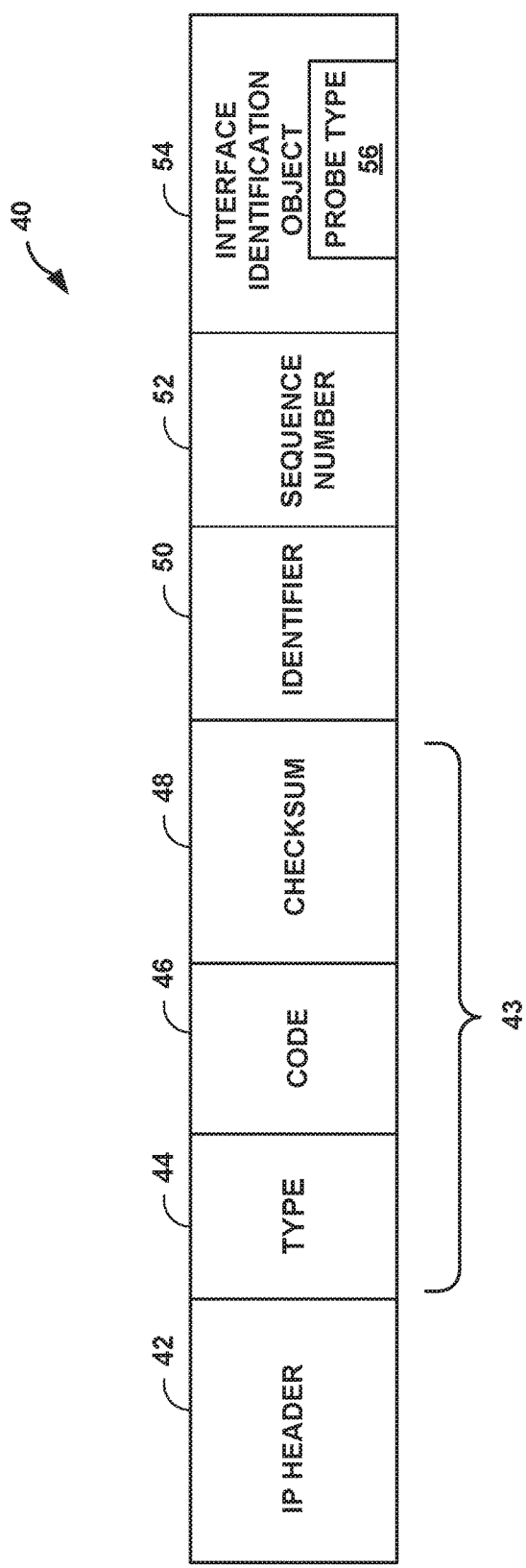
FIG. 3 is a block diagram illustrating an exemplary packet format for use in testing connectivity of unnumbered interfaces.

FIG. 3 is a block diagram illustrating an exemplary format of a packet 40 for use in testing connectivity of specific unnumbered interfaces. Packet 40 may, for example, be an ICMP Extended Echo message that has been extended to include additional fields. Packet 40 includes an IP header 42 that contains destination information for purposes of routing. For example, IP header 42 may contain a source IP address, a destination IP address, and a Time to Live (TTL) value that indicates a maximum number of hops the packet can traverse on the way to the packet's destination prior to expiration.

The source IP address identifies an interface on the probing node, such as network interface 15A of network device 12. The destination IP address identifies the destination interface to which the message is to be delivered. That is, the destination IP address specifies an IP address for a reachable interface, IP address assigned to network interface 15B of router 13.

In addition, packet 40 includes an ICMP header 43 having a type field 44, a code field 46, and a checksum 48. Type field 44 is used to identify the type of message. For example, a type value of "8" indicates that the packet is an echo request. This type of packet is used by both the ping and traceroute utilities. A type value of "0" indicates that the packet is an echo reply. Code field 46 varies depending on the particular type of message, as specified by type field 44. For example, for a traceroute reply packet having type 11 ("time exceeded"), a code value of "0" indicates that the time to live expired while the packet was in transit. Checksum 48 may be calculated taking into account the entire ICMP packet. Identifier 50 is an identifier to aid in matching Extended Echo Replies to Extended Echo Requests. Sequence number 52 carries an incremented sequence number for the particular eping message and also aids in matching Extended Echo replies to Extended Echo requests.

Moreover, in accordance with the techniques described herein, packet 40 includes an additional interface identification object 54 that carries information for identifying the unreachable interface to be probed. Within interface identification object 54, probe type field 56 specifies how the information contained within the interface identification object identifies the interface to be probed. As one example, probe type field 56 supports the following modes for identifying the probed interface:

1. INTERFACE ADDRESS—the unreachable interface to be probed is specified by a unique network address assigned to the unreachable interface. The address family of the probed address specified by interface identification object 54 need not be the same address family as that of the destination address for the probed device as specified in IP header 42. For example, the probed interface can be identified by its Ethernet address while the destination address for IP header 42 can be an IPv4 or IPv6 network address.

2. INTERFACE NAME—the unreachable interface to be probed is specified by the textual name assigned to the particular interface at the targeted device. This allows the user to specify the interface's local name on the probed network device, i.e., the textual name used at the probed device's local console for the interface. Examples include "wan1" or "want-2" as specified in an interface table on the probed machine. The interface name may, for example, comply with the ifName object described in RFC2863, "The Interfaces Group MIB," the entire contents if which are incorporated herein by reference.

3. INTERFACE DESCRIPTION—The Interface Description field contains the human-readable interface description. This allows the user to enter a textual string containing information about the interface to be compared with interface descriptions specified within the configuration data of the probed device. This string may, for example, specify the name of the manufacturer, the product name and the version of the interface hardware/software. The interface description may, for example, comply with the ifDescr object described in RFC2863.

4. INTERFACE INDEX—the unreachable interface to be probed is specified by an index number, which is a positive integer within an enumerated sequence of integer values up to the number of interfaces allocated in the probed device (e.g., 1-64), where the indexes are sequentially assigned to the interfaces within the probed device and have scope limited to that device. The interface description may, for example, comply with the ifIndex object described in RFC2863.

An extended ICMP echo reply message may take a form similar to that of packet 40 of FIG. 3 excluding interface identification object 54. In the extended ICMP echo reply message, code 46 indicates the operational status of the probed interface. Defined values for code 46 may be, for example, INACTIVE, ACTIVE, INTERFACE_DOES_NOT_EXIST and QUERY NOT SUPPORTED.

Figure 4:
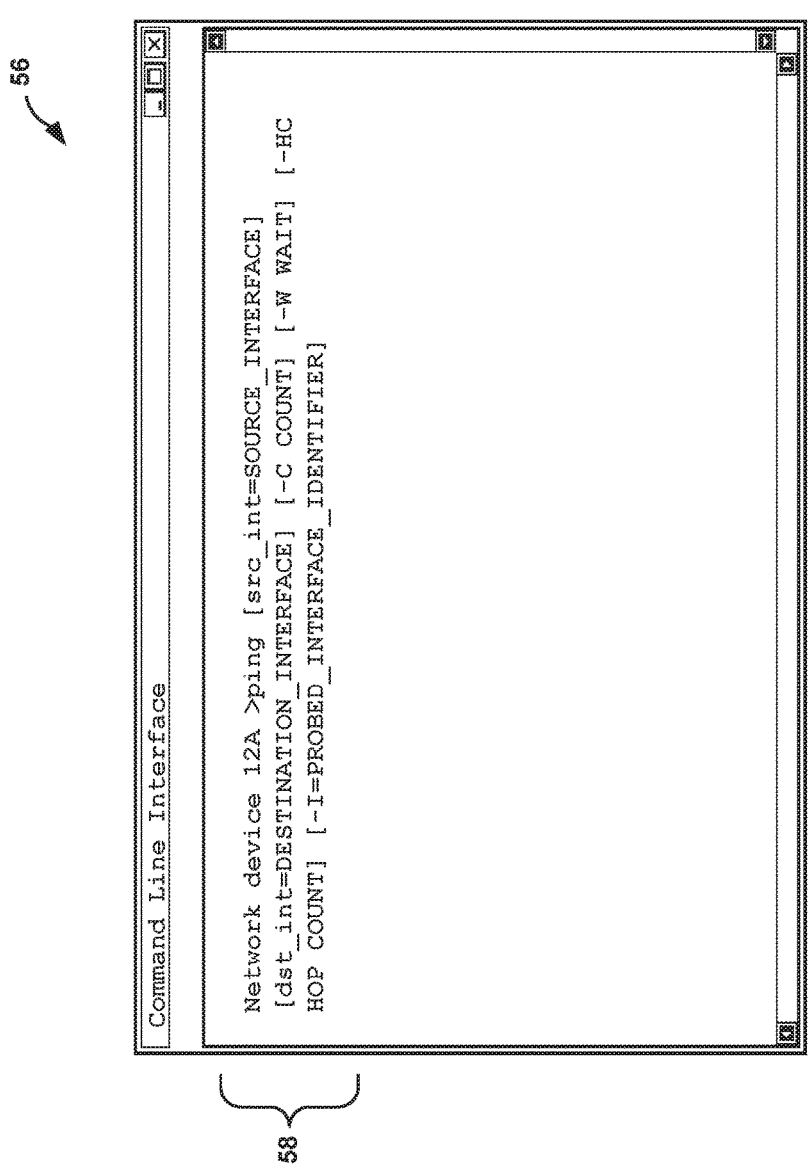
FIG. 4 is an exemplary screen illustration depicting an example command line interface as viewed on a server or other network device when executing the extend ping protocol described herein.

FIG. 4 is an exemplary screen illustration depicting an example command line interface 56 generated by eping 36 when executing on a device, such as network device 12 of FIGS. 1 and 2. As shown in FIG. 4, the eping software utility accepts a variety of parameters. In operation, eping 36 generally accepts input parameters, sets a counter and enters a loop to be exited when the counter is equal to zero. For each iteration of the loop, eping emits an ICMP Extended Echo, decrements the counter, sets a timer, and waits for the timer to expire. If an expected ICMP Extended Echo Reply arrives while eping is waiting for the timer to expire, eping relays information returned by that message to its user.

Command line interface 56 illustrates one example syntax format 58 for the eping utility. Syntax format 58 includes a number of options for the eping utility, enclosed in brackets.

As shown in this example, the user invokes eping 36 by entering the "ping" command at the CLI presented by network device 12. At this time, the user may enter the source interface address to specify the source address to be used in the header of the ICMP extended echo packet and destination interface address to be used as the destination address in the header of the ICMP extended echo packet, i.e., the reachable interface to which the ICMP extended echo message is sent. For example, the destination interface address can be an IPv4 address or an IPv6 address reachable the network device 12.

Optional field "-c" allows administrator 16 to define a number (count) of echo requests to be sent, i.e., the number of iterations to perform until terminating the process. Optional field "-w" allows administrator 16 to define the duration between each transmission of eping packets, in seconds. Optional field "-hc" allows administrator 16 to limit the number of hops that the packet will traverse on the network.

"PROBED_INTERFACE_IDENTIFIER" is an optional field in which administrator 16 can further input information for identifying an unreachable network interface to be probed, i.e., an interface that is reachable via the probed device associated with the destination interface address specified above. If the interface is probed interface identifier is specified, it can be:

- an interface description
- an interface name
- an address from any address family (e.g., IPv4, IPv6, MAC)
- an interface index The probed interface identifier can have any scope. As examples, the probed interface identifier can be:

- an IPv6 or IPv4 address having a scope that is global
- an IPv6 or IPv4 address having a scope that is link-local
- an interface name having a scope that is node-local at the target device
- an interface description having a scope that is node-local at the target device
- an interface index having a scope that is node-local at the target device Moreover, if the probed interface identifier is an address, it does not need to be of the same address family as the destination interface address. For example, eping accepts an IPv4 destination interface address and an IPv6 probed interface identifier or an Ethernet MAC address.

As described herein, aspects of this disclosure allow the status of unreachable interfaces of a remote device to be determined. Moreover, a user may specify and identify the probed interface in a variety of ways.

The following examples illustrate example implementations of the extended ePing described herein. For purposes of illustration, the examples will be explained in reference to the example network environment of FIG. 1. In particular, the following examples are explained with respect to utilizing ePing on network device 12 to ping an unreachable interface, such as either of interfaces 15C of router 13:

This example illustrates utilizing ePing on network device 12 to determine the status of a global IP address of a reachable network interface 15B of router 1:

>eping 1.1.1.1 <to ping the loopback>

This example illustrates utilizing ePing on network device 12 to determine the status of an unreachable interface 15C of router 13 using a link-local address of that interface that is limited in scope to devices coupled to link 17A:

>eping 1.1.1.1 -I FE08::1 <to ping an interface by its link-local address>

This example illustrates utilizing ePing on network device 12 to determine the status of an unreachable interface 15C of router 13 using an interface name ("ge-0/0/0.2") of that interface as defined in the configuration data of router 13:

>eping 1.1.1.1 -I ge-0/0/0.2 <to ping the same interface by its ifName

This example illustrates utilizing ePing on network device 12 to determine the status of an unreachable interface 15C of router 13 using a string ("SONET interface; ACME manufacturing v1.1") to match all or portions of an interface description of that interface as defined in the configuration data of router 13:

>eping 1.1.1.1 -I "SONET interface; ACME manufacturing v1.1" <to ping the same interface by its ifDescr>

This example illustrates utilizing ePing on network device 12 to determine the status of an unreachable interface 15C of router 13 using an interface index (5) as defined in the configuration data of router 13:

>eping 1.1.1.1 -I5 <to ping the same interface by its ifIndex

The following sections illustrate additional examples in which the target device is addressable by a global IP address of 10.10.10.2. In this first set of examples, ePing is used to determine the status of an unreachable interface of the target device by specifying an interface name "ge-0/0/0.0" of the interface as defined within the configuration data for the interface.

Query Using Interface Name
A. ge-0/0/0.0 is UP
root@R11_re0:~# eping -I ge-0/0/0.0 10.10.10.2
PING 10.10.10.2 (10.10.10.2): 56 data bytes
8 bytes from 10.10.10.2 via ge-0/0/0.0: icmp_seq=0 ttl=64
Extended Ping Results
    Queried for status of Interface name: ge-0/0/0.0
    Status: ACTIVE
---10.10.10.2 ping statistics---
1 packets transmitted, 1 packets received, ON packet loss
B. ge-0/0/1.0 is DOWN
root@R11_re0:~# eping -I ge-0/0/1.0 10.10.10.2
PING 10.10.10.2 (10.10.10.2): 56 data bytes
8 bytes from 10.10.10.2 via ge-0/0/0.0: icmp_seq=0 ttl=64
Extended Ping Results
    Queried for status of Interface name: ge-0/0/1.0
    Status: INACTIVE
---10.10.10.2 ping statistics---
1 packets transmitted, 1 packets received, ON packet loss
C. ge-0/0/3.0 does not exist
root@R11 re0:~# eping -I ge-0/0/3.0 10.10.10.2
PING 10.10.10.2 (10.10.10.2): 56 data bytes
8 bytes from 10.10.10.2 via ge-0/0/0.0: icmp_seq=0 ttl=64
Extended Ping Results
    Queried for status of Interface name: ge-0/0/3.0
    Status: Non Existent
---10.10.10.2 ping statistics---
1 packets transmitted, 1 packets received, ON packet loss In this second set of examples, ePing is used to determine the status of an unreachable interface of the target device by specifying an IP address "20.20.20.1" of the interface as defined within the address range for the network within which the unreachable interface is used (e.g., network 14B of FIG. 1).

Query Using IP Address
A. 20.20.20.1 is configured on disabled ifl
root@R11_re0:~# eping -I 20.20.20.1 10.10.10.2
PING 10.10.10.2 (10.10.10.2): 56 data bytes
8 bytes from 10.10.10.2 via ge-0/0/0.0: icmp_seq=0 ttl=64
Extended Ping Results
   Queried for status of IP address: 20.20.20.1
   Status: INACTIVE
---10.10.10.2 ping statistics---
1 packets transmitted, 1 packets received, ON packet loss
B. 20.20.20.5 is not configured on the box
root@R11_re0:~# eping -I 20.20.20.5 10.10.10.2
PING 10.10.10.2 (10.10.10.2): 56 data bytes
8 bytes from 10.10.10.2 via ge-0/0/0.0: icmp_seq=0 ttl=64
Extended Ping Results
   Queried for status of IP address: 20.20.20.5
   Status: Non Existent
---10.10.10.2 ping statistics---
1 packets transmitted, 1 packets received, ON packet loss
C. 10.10.10.2 is configured on an enabled ifl
root@R11_re0:~# eping -I 10.10.10.2 10.10.10.2
PING 10.10.10.2 (10.10.10.2): 56 data bytes
8 bytes from 10.10.10.2 via ge-0/0/0.0: icmp_seq=0 ttl=64
Extended Ping Results
   Queried for status of IP address: 10.10.10.2
   Status: ACTIVE
---10.10.10.2 ping statistics---
1 packets transmitted, 1 packets received, ON packet loss In this third set of examples, ePing is used to determine the status of an unreachable interface of the target device by specifying an IPv6 address "abcd::1 10.10.10.2" of the interface as defined within the address range for the network within which the unreachable interface is used (e.g., network 14B of FIG. 1).

Figure 5:
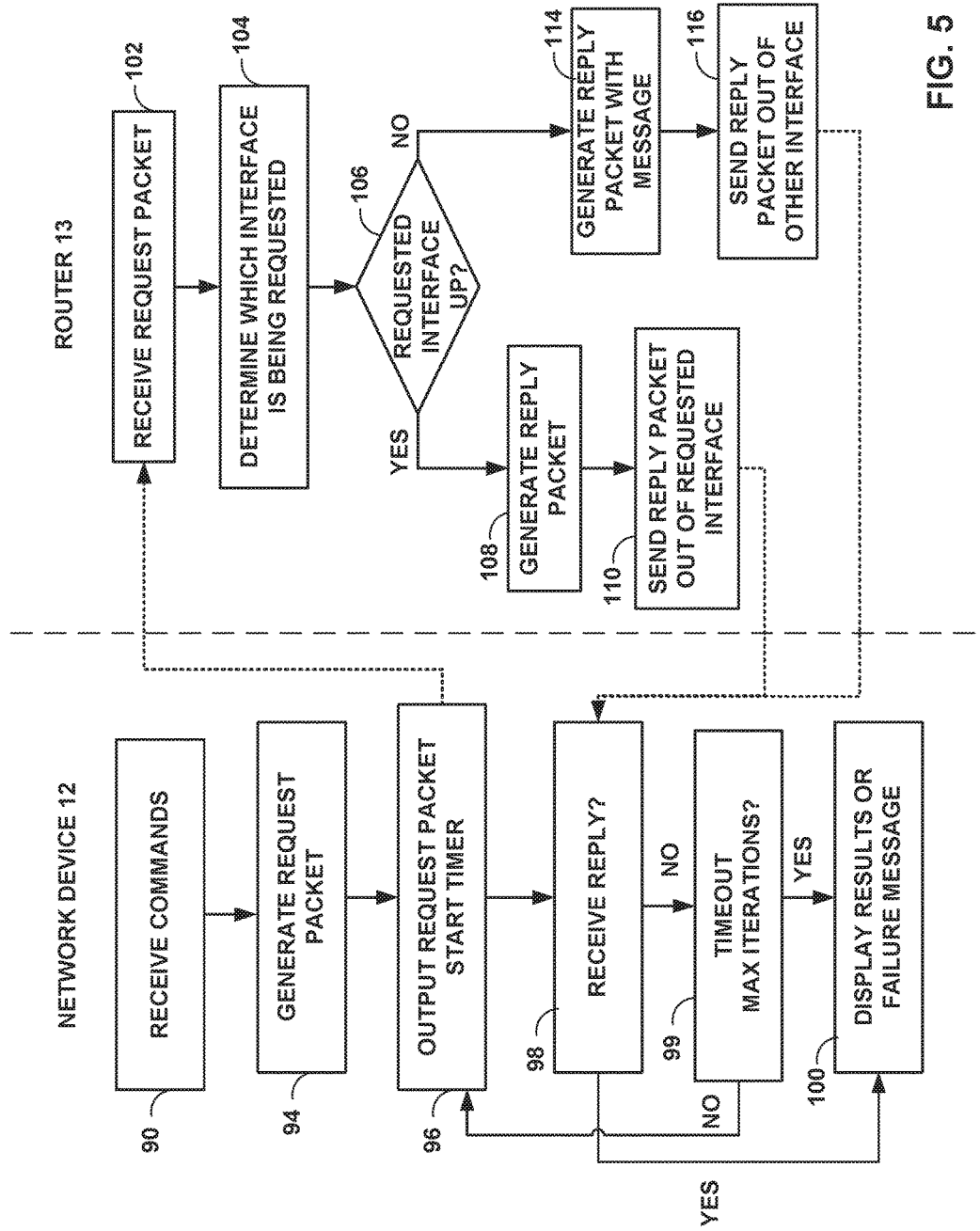
FIG. 5 is a flowchart illustrating exemplary operation of a computer network in probing the status of an unreachable interface using a ping protocol that has been extended as described herein.

Query Using V6 Address:
A. abcd::1 is configured on interface that is UP
root@R11_re0:/var/tmp # ./eping -I abcd::1 10.10.10.2
PING 10.10.10.2 (10.10.10.2): 56 data bytes
8 bytes from 10.10.10.2 via ge-0/0/0.0: icmp_seq=0 ttl=64
Extended Ping Results
   Queried for status of IP6 address abcd::1
Interface name:
   Status: ACTIVE
---10.10.10.2 ping statistics---
1 packets transmitted, 1 packets received, ON packet loss
B. 2001::1 is configured on an interface that is DOWN
root@R11_re0:/var/tmp # ./eping -I 2001::1 10.10.10.2
PING 10.10.10.2 (10.10.10.2): 56 data bytes
8 bytes from 10.10.10.2 via ge-0/0/0.0: icmp_seq=0 ttl=64
Extended Ping Results
   Queried for status of IP6 address 2001::1
Interface name:
   Status: INACTIVE
---10.10.10.2 ping statistics---
1 packets transmitted, 1 packets received, ON packet loss
C. 2001::2 is not configured on any interface
root@R11_re0:/var/tmp # ./eping -I 2001::2 10.10.10.2
PING 10.10.10.2 (10.10.10.2): 56 data bytes
8 bytes from 10.10.10.2 via ge-0/0/0.0: icmp_seq=0 ttl=64
Extended Ping Results
   Queried for status of IP6 address 2001::2
Interface name:
   Status: Non Existent
---10.10.10.2 ping statistics---
1 packets transmitted, 1 packets received, ON packet loss In this fourth set of examples, ePing is used to determine the status of an unreachable interface of the target device by specifying an index of the interface as defined within the private configuration data for the target device:

Query Using snmp Index:
A. 542 belongs to an active
root@R11_re0:~# eping -I 542 10.10.10.2
PING 10.10.10.2 (10.10.10.2): 56 data bytes
8 bytes from 10.10.10.2 via ge-0/0/0.0: icmp_seq=0 ttl=64
Extended Ping Results
   Queried for status of Interface index: 542
   Status: ACTIVE
B. 543 belongs to a disabled fl
---10.10.10.2 ping statistics---
1 packets transmitted, 1 packets received, ON packet loss
root@R11_re0:~# eping -I 543 10.10.10.2
PING 10.10.10.2 (10.10.10.2): 56 data bytes
8 bytes from 10.10.10.2 via ge-0/0/0.0: icmp_seq=0 ttl=64
Extended Ping Results
   Queried for status of Interface index: 543
   Status: INACTIVE
C. 544 belongs to non existent fl
---10.10.10.2 ping statistics---
1 packets transmitted, 1 packets received, ON packet loss
root@R11_re0:~# eping -I 544 10.10.10.2
PING 10.10.10.2 (10.10.10.2): 56 data bytes
8 bytes from 10.10.10.2 via ge-0/0/0.0: icmp_seq=0 ttl=64
Extended Ping Results
   Queried for status of Interface index: 544
   Status: Non Existent
---10.10.10.2 ping statistics---
1 packets transmitted, 1 packets received, ON packet loss FIG. 5 is a flowchart illustrating exemplary operation of network environment 10 in testing status of unreachable network interfaces using an extended ping protocol. For exemplary purposes, FIG. 5 is explained with reference to network device 12 and router 13 of FIG. 1.

Initially, network device 12 receives commands entered by a user, such as administrator 16 (90) to invoke the extended ping protocol (eping). Administrator 16 may enter the commands, for example, via a command line interface, test script, GUI, management interface or the like. The commands may include an address for reaching router 13 as well as information for identifying an unreachable interface of router 13 to be tested as described herein. Alternatively, administrator 16 may utilize the extended ping protocol in a conventional manner.

Network device 12 generates a request packet (94), such as packet 40 of FIG. 3. That is, the request packet may be an ICMP packet, such as an extended ping echo request packet that is extended to include additional fields as described herein. Network device 12 outputs the request packet to be forwarded to the destination interface address specified in the IP header of the packet and starts a timer (96).

In the event network device 12 receives an echo reply packet from router 13 (98), the network device display results or statistics about the reply packet on the command line interface (100). In some cases, network device 12 may not receive a reply packet from router 13 before the timer expires (99). In this situation, network device 12 repeats the process of generating an echo request until either reply is received or a maximum number of iterations has been reached (99). In this case, network device 12 displays a failure message on the command line interface (100).

In either case, after network device 12 has sent a request packet, router 13 may receive the request packet on the network interface assigned the IP address that is specified as a destination address within the packet's IP header (102). Upon receiving the request packet, router 13 examine interface identification object 54 (FIG. 3) of the request packet to determine which interface of router 13, if any, has been specifically designated for testing (104). As described herein, administrator 16 may have specified the interface in a variety of manners.

If the interface is up (YES branch of 106), router 13 generate a reply packet (108). The reply packet may be an ICMP packet as shown in FIG. 3, such as an echo reply packet. When router 13 generates the echo reply packet, router 13 may swap the source and destination IP addresses in the IP header 42 and replace the "8" in the ICMP Type Field 44 with a "0" (for Echo Reply), add any optional data from variable user data field 50, and recalculate all the checksums for field 48.

Router 13 then sends the echo reply packet to network device 12 (110). For example, router 13 may send the echo reply packet on the original interface on which the packet was received, i.e., interface 15B, or any other interface from which the probing device (network device 12) is reachable. Provided intermediate connectivity exists, network device 12 receives the reply packet (98), and displays results about the reply packet (100). In the case where the probed interface is up but intermediate connectivity does not exist, network device 12 will not receive the reply packet before a time-out period expires (98), likely causing network device 12 to output a failure message (100).

In the case where the specified unreachable destination interface (e.g., interface 15C-2 or 15C-3) is down (NO branch of 106), router 13 generates a reply packet with data indicating that the interface is down (114), and sends the reply packet out the original interface 15B on which the echo request was received (116). Network device 12 receives the reply packet (98) and displays a failure message (100).

Various embodiments of the invention have been described. These and other embodiments are within the scope of the following claims.

The invention claimed is:

1. A method comprising:
   executing an extended ping software utility on a source network device;
   presenting, with the extended ping software utility, a user interface to receive input from a user, wherein the input identifies a network address of a reachable network interface of a target device, identification information for an unreachable network interface of the target device, and a probe type that specifies one of a plurality of probe types by which the identification information identifies the unreachable network interface; and
   outputting, from the source network device with the software utility, a ping echo request packet to test the status of the unreachable network interface of the target device,
   wherein the ping echo request packet includes a header having a destination address of the network address of the reachable network interface of the target device,
   wherein the ping echo request packet includes an identification information object specifying the identification information, and
   wherein the ping echo request packet includes a probe type field specifying the probe type by which the identification information identifies the unreachable network interface of the target device.

2. The method of claim 1, wherein the probe type field specifies a network address probe type to direct the target device to compare the identification information to a network address assigned to the unreachable network interface.

3. The method of claim 1, wherein the network address of the unreachable network interface of the target device and the network address of the reachable network interface of the target device are allocated from different address families.

4. The method of claim 1, wherein the probe type field specifies an interface name probe type to direct the target device to compare the identification information to a textual name of the unreachable network interface as defined within configuration data local to the target device.

5. The method of claim 1, wherein the probe type field specifies an interface description probe type to direct the target device to compare the identification information to a textual description of the unreachable network interface as defined within configuration data local to the target device.

6. The method of claim 5, wherein the textual description includes text specifying a manufacturer, a product name and a version of hardware or software of the unreachable network interface.

7. The method of claim 1, further comprising:
   receiving the ping echo request packet on the reachable network interface of the target device;
   processing the probe type specified within the probe type field to select a mode for comparing the identification information to configuration data of the target device;
   based on the selected mode, comparing the identification information to parameters within the configuration data of the target device to resolve the identification information to the unreachable network interface of target device; and
   outputting, to the source network device and via the reachable network interface, a reply packet indicating a status of the unreachable network interface.

8. The method of claim 1, wherein presenting with the software utility a user interface comprises presenting the user interface to include optional fields for the user to enter the probe type and the identification information for the unreachable network interface.

9. The method of claim 1, wherein network reachability does not exist between the source network device and the unreachable network interface of the target device.

10. The method of claim 1, wherein the unreachable network interface is not reachable by the source network device, and wherein the reachable network interface is reachable by the source network device.

11. A source network device comprising:
a hardware-based programmable processor; and
an extended ping software utility executing on the processor of source network device that presents a user interface to receive input from a user,
wherein the input identifies a network address of a reachable network interface of a target device, identification information for an unreachable network interface, and a probe type that specifies one of a plurality of probe types by which the identification information identifies the unreachable network interface,
wherein the software utility outputs a ping echo request packet to test the status of the unreachable network interface of the target device,
wherein the ping echo request packet includes a header having a destination address of the network address of the reachable network interface of the target device,
wherein the ping echo request packet includes an identification information object specifying the identification information, and
wherein the ping echo request packet includes a probe type field specifying the probe type by which the identification information identifies the unreachable network interface of the target device.

12. The source network device of claim 11, wherein the network address of the unreachable network interface of the target device and the network address of the reachable network interface of the target device are allocated from different address families.

13. The source network device of claim 11, wherein the software utility:
receives the ping echo request packet on the reachable network interface of the target device;
processes the probe type specified within the probe type field to select a mode for comparing the identification information to configuration data of the target device;
based on the selected mode, compares the identification information to parameters within the configuration data of the target device to resolve the identification information to the unreachable network interface of target device; and
outputs, to the source network device and via the reachable network interface, a reply packet indicating a status of the unreachable network interface.

14. A method comprising:
receiving, from a source device and via a reachable network interface on a target device, an extended ping echo request packet to test the status of an unreachable network interface on the target device, wherein the extended ping echo request packet includes a header having a destination address of the reachable network interface of the target device, wherein the extended ping echo request packet includes an identification information object specifying identification information for the unreachable network interface of the target device and a probe type field specifying a probe type by which the identification information identifies the unreachable network interface of the target device;
processing the probe type specified within the probe type field to select a mode for comparing the identification information to configuration data of the target device;
based on the selected mode, comparing the identification information to parameters within the configuration data of the target device to resolve the identification information to the unreachable network interface of target device; and
outputting, to the source device and via the reachable network interface, a reply packet indicating a status of the unreachable network interface.

15. The method of claim 14, wherein the probe type field specifies a network address probe type to direct the target device to compare the identification information to a network address assigned to the unreachable network interface.

16. The method of claim 14, wherein the network address of the unreachable network interface of the target device and the network address of the reachable network interface of the target device are allocated from different address families.

17. The method of claim 14, wherein the probe type field specifies an interface name probe type to direct the target device to compare the identification information to a textual name of the unreachable network interface as defined within configuration data local to the target device.

18. The method of claim 14, wherein the probe type field specifies an interface description probe type to direct the target device to compare the identification information to a textual description of the unreachable network interface as defined within configuration data local to the target device.

19. The method of claim 18, wherein the textual description includes text specifying a manufacturer, a product name and a version of hardware or software the unreachable network interface.

20. The method of claim 14, wherein network reachability does not exist between the source device and the unreachable network interface of the target device.

* * * * *